(12) United States Patent
Hsu et al.

(10) Patent No.: US 8,984,255 B2
(45) Date of Patent: Mar. 17, 2015

(54) PROCESSING DEVICE WITH ADDRESS TRANSLATION PROBING AND METHODS

(71) Applicant: Advanced Micro Devices, Inc., Sunnyvale, CA (US)

(72) Inventors: Lisa Hsu, Raleigh, NC (US); Nuwan Jayasena, Sunnyvale, CA (US); Andrew Kegel, Redmond, WA (US); Bradford M. Beckmann, Redmond, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 143 days.

(21) Appl. No.: 13/723,379

(22) Filed: Dec. 21, 2012

(65) Prior Publication Data

US 2014/0181460 A1 Jun. 26, 2014

(51) Int. Cl.
*G06F 12/00* (2006.01)
*G06F 12/10* (2006.01)

(52) U.S. Cl.
CPC ........ *G06F 12/1027* (2013.01); *G06F 12/1081* (2013.01); *G06F 2212/302* (2013.01); *G06F 2212/681* (2013.01); *G06F 2212/684* (2013.01)
USPC ............................ 711/207; 711/122; 711/206

(58) Field of Classification Search
None
See application file for complete search history.

(56) References Cited

U.S. PATENT DOCUMENTS

| 6,092,172 A | 7/2000 | Nishimoto et al. |
| 2011/0231612 A1* | 9/2011 | Karlsson et al. .............. 711/119 |

FOREIGN PATENT DOCUMENTS

EP 1182559 A1 2/2002

OTHER PUBLICATIONS

International Search Report and Written Opinion issued in corresponding International Patent Application No. PCT/US2013/075711 on Mar. 31, 2014, consisting of 9 pp.

* cited by examiner

*Primary Examiner* — Shawn X Gu
(74) *Attorney, Agent, or Firm* — Volpe and Koenig, P.C.

(57) ABSTRACT

A data processing device is provided that employs multiple translation look-aside buffers (TLBs) associated with respective processors that are configured to store selected address translations of a page table of a memory shared by the processors. The processing device is configured such that when an address translation is requested by a processor and is not found in the TLB associated with that processor, another TLB is probed for the requested address translation. The probe across to the other TLB may occur in advance of a walk of the page table for the requested address or alternatively a walk can be initiated concurrently with the probe. Where the probe successfully finds the requested address translation, the page table walk can be avoided or discontinued.

44 Claims, 3 Drawing Sheets

PROCESSING DEVICE WITH ADDRESS TRANSLATION PROBING AND METHODS

FIELD

The present disclosure is generally directed to data processing devices that include processors that employ translation look-aside buffers (TLBs) in connection with address translations of page tables of a memory.

BACKGROUND

The use of virtual addressing is well known in the art of data processing. Conventionally, page tables are provided to maintain lists of virtual addresses with corresponding physical memory locations of the data associated with the virtual address, i.e. address translations. The process of obtaining a physical memory address of stored data from the page table list of virtual addresses is known as a page table walk.

It is common to use 4 Kb and 8 Kb virtual pages, but larger sizes, such as 2 Mb or 4 Mb or greater, can be used. Page table walks can take a significant amount of time compared to the operating speed of a processor. In order to avoid doing a page table walk to obtain each physical address of stored data corresponding to a virtual address, i.e. each translation, translation look-aside buffers (TLBs) are used to store address translations that are being used or may likely be used by a processor.

Conventionally, a processor will look first for a desired address translation in a TLB associated with a page table of a memory. If the desired address translation is found, the need to walk the page table is avoided. If the desired address translation is not found, the page table is walked to find the address translation. In some instances, multiple levels of TLBs that may serve different functions are disposed between the processor and the page table so that the processor will descend through the hierarchy of levels looking for a desired translation and perform a page table walk only if it is not discovered in descending through the hierarchy of TLBs.

Page tables and TLBs may generally be employed with any type of data processor, including, but not limited to, a central processing unit (CPU), a graphics processing unit (GPU), and an accelerated processing unit (APU).

SUMMARY OF EXEMPLARY EMBODIMENTS

A data processing device is provided that employs multiple translation look-aside buffers (TLBs) associated with respective processors that are configured to store selected address translations of a page table of a memory shared by the processors. The processing device is configured such that when an address translation is requested by a processor and is not found in the TLB associated with that processor, another TLB is probed for the requested address translation. The probe across to the other TLB may occur in advance of a walk of the page table for the requested address or alternatively a page table walk can be initiated concurrently with the probe. Where the probe successfully finds the requested address translation, the page table walk can be avoided or discontinued.

In one embodiment, a data processing device includes first and second processing units and a page table of a shared memory. A first translation look-aside buffer (TLB) hierarchy is configured to store selected address translations of the page table for use by the first processing unit. A second TLB hierarchy is configured to store selected address translations of the page table for use by the second processing unit. The processing device is configured to probe the second TLB hierarchy for an address translation requested by the first processing unit upon a condition that the requested address translation was not found in the first TLB hierarchy.

Such a data processing device can be configured to conduct a walk of the page table for the requested address translation upon a condition that the requested address translation was not found in the probe of the second TLB hierarchy. Alternatively, the data processing device can be configured to initiate a walk of the page table for the requested address translation concurrently with the probe of the second TLB hierarchy.

In some embodiments, the data processing device is also configured to probe the first TLB hierarchy for an address translation requested by the second processing unit upon a condition that the address translation requested by the second processing unit was not found in the second TLB hierarchy. In such case, the data processing device can be configured to conduct a walk of the page table for the address translation requested by the second processing unit upon a condition that the address translation requested by the second processing unit was not found in the probe of the first TLB hierarchy. Alternatively, the data processing device can be configured to initiate a walk of the page table for the address translation requested by the second processing unit concurrently with the probe of the first TLB hierarchy.

The processing units may, for example, be of the same or different type such as central processing units (CPUs), graphics processing units (GPUs) or accelerated processing units (APUs) or some combination thereof. Either or both of the first or second processing units or both, may be one of a plurality of first or respectively second processing units associated with the respective TLB hierarchy.

In one example, all of the first processing units are CPUs and the first TLB hierarchy includes a separate level one TLB associated with each CPU to store selected address translations of the page table for use by that CPU and a level two TLB associated with the level one TLBs. In this example, the processing device is configured to unsuccessfully search the level one TLB associated with the first processing unit and the level two TLB to find the address translation requested by the first processing unit as the condition to probing the second TLB hierarchy for the address translation requested by the first processing unit.

In another example, all of the first processing units are GPUs and the first TLB hierarchy comprises a single TLB associated with all of the GPUs to store selected address translations of the page table for use by the GPUs. In this example, the processing device is configured unsuccessfully search the single TLB to find the address translation requested by the first processing unit as the condition to probing the second TLB hierarchy for the address translation requested by the first processing unit.

The data processing device may have a plurality of second processing units that includes the second processing unit where the second TLB hierarchy includes a separate level one TLB associated with each of the plurality of second processing units to store selected address translations of the page table for use by that second processing unit and a level two TLB associated with the level one TLBs. In such case, the processing device is configured to probe the second TLB hierarchy for the address translation requested by the first processing unit by searching the level one TLB associated with a selected second processing unit and the level two TLB to find the address translation requested by the first processing unit.

In another embodiment, a data processing device includes a first translation look-aside buffer (TLB) configured to store selected address translations of a page table for use by a first processing unit as well as a second TLB configured to store selected address translations of the page table for use by a second processing unit. The processing device is configured to probe the second TLB for an address translation requested by the first processing unit upon a condition that the requested address translation was not found in the first TLB.

Such a data processing device can include a level two TLB where the first and second TLBs comprise a first level of a TLB hierarchy configured to store selected address translations of the page table for use by the first and second processing units and the level two TLB comprises a second level of the TLB hierarchy. In such case, the data processing device can be configured to conduct a walk of the page table for the requested address translation upon a condition that the requested address translation was not found in either the probe of the second TLB or the level two TLB. As one alternative, the data processing device can be configured to initiate a walk of the page table for the requested address translation concurrently with the probe of the second TLB upon a condition that the requested address translation was not found in the level two TLB.

Methods corresponding to the example embodiments and alternative are also provided.

In addition, another embodiment provides a non-transitory computer-readable storage medium storing a set of instructions for execution by a general purpose computer to facilitate manufacture of a selectively designed integrated circuit. The non-transitory computer-readable storage medium contains instructions that are hardware description language (HDL) instructions used for the manufacture of a device including one or more aspects of the embodiments.

Such an integrated circuit may include a first TLB hierarchy configured to store selected address translations of a page table for use by a first processing unit and a second TLB hierarchy configured to store selected address translations of the page table for use by a second processing unit. In such case, the integrated circuit is configured to probe the second TLB hierarchy for an address translation requested by the first processing unit upon a condition that the requested address translation was not found in the first TLB hierarchy.

As one alternative, the integrated circuit may include a first translation look-aside buffer (TLB) configured to store selected address translations of a page table for use by a first processing unit and a second TLB configured to store selected address translations of the page table for use by the second processing unit. In such case, the integrated circuit is configured to probe the second TLB for an address translation requested by the first processing unit upon a condition that the requested address translation was not found in the first TLB.

BRIEF DESCRIPTION OF THE DRAWINGS

A more detailed understanding may be had from the following description, given by way of example in conjunction with the accompanying drawings.

DETAILED DESCRIPTION

Data processing device are ubiquitous today and are incorporated to into a vast number of different types of products.

Generally, processors are configured to utilize translation look-aside buffers (TLBs) that are configured to store selected address translations of a page table of a memory in order to avoid walking the page table each time a processor requires an address translation stored on the page table.

Figure 1:
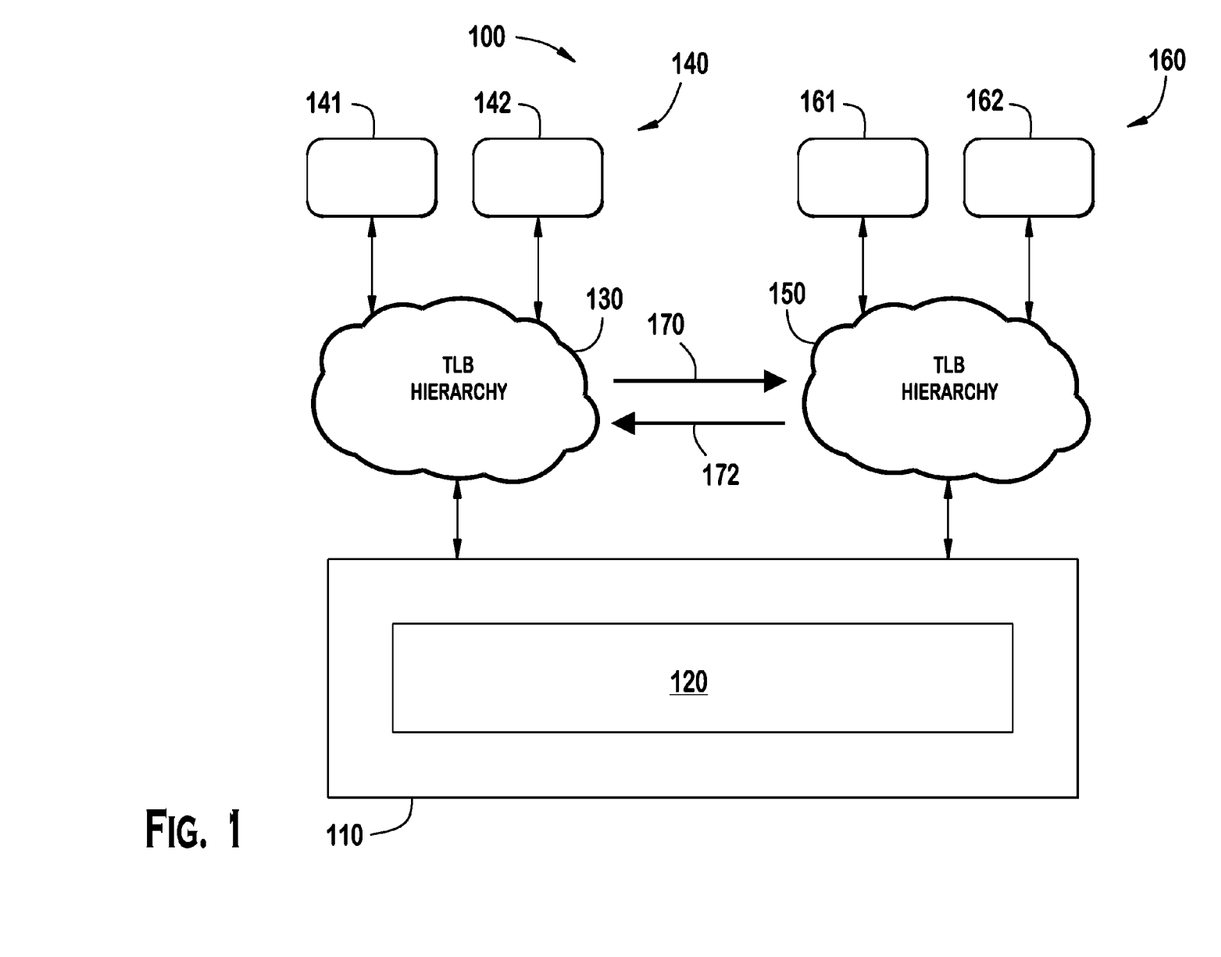
FIG. 1 is a block diagram of a processing device in which one or more disclosed embodiments may be implemented.

Referring to FIG. 1, an example data processing device 100 is illustrated where multiple processors share a memory 110 that includes a page table 120. In the illustrated example of FIG. 1, the processing device 100 includes a first TLB hierarchy 130 that is configured to store selected address translations of the page table 120 for a first group 140 of first processing units 141, 142. The processing device 100 also includes a second TLB hierarchy 150 that is configured to store selected address translations of the page table 120 for a second group 160 of second processing units 161, 162.

In operation, selected address translations of the page table 120 are stored in the first TLB hierarchy 130 for the first group 140 of first processing units 141, 142. Selected address translations of the page table 120 are also stored in the second TLB hierarchy 150 for the second group 160 of second processing units 161, 162. In connection with data processing, the processing units 141, 142, 161, 162 will look first for desired address translation in their respective TLB hierarchies 130, 150 associated with a page table of a memory. Where the TLB hierarchy 130, 150 includes multiple levels of TLBs, the processor will descend through the hierarchy of levels looking for a desired address translation.

If the desired address translation is found, the need to walk the page table 120 is avoided. If the desired address translation is not found, the page table 120 may need to be walked to find the address translation.

In order to possibly avoid the need to await the results of a walk of the page table, the processing device 100 is configured to probe 170 the second TLB hierarchy 150 for an address translation requested by one of the first processing units 141, 142 of the first group 140 upon a condition that the requested address translation was not found in the first TLB hierarchy 130. The data processing device 100 is further configured to conduct a walk of the page table 120 for the requested address translation upon a condition that the requested address translation was not found in the probe 170 of the second TLB hierarchy 150. As one alternative, the data processing device 100 can be configured to initiate a walk of the page table 120 for the requested address translation concurrently with the probe of the second TLB hierarchy.

In one embodiment, the data processing device 100 is also configured to probe 172 the first TLB hierarchy 130 for an address translation requested by one of the second processing unit 161, 162 upon a condition that the address translation requested by the second processing units 161, 162 was not found in the second TLB hierarchy 150. In such case, the data processing device 100 can be configured to conduct a walk of the page table 120 for the address translation requested by the second processing unit 161, 162 upon a condition that the address translation requested by the second processing unit 161, 162 was not found in the probe 172 of the first TLB hierarchy 130. Alternatively, the data processing device 100 can be configured to initiate a walk of the page table for the address translation requested by the second processing unit 161, 162 concurrently with the probe 172 of the first TLB hierarchy 130.

The processing units 141, 142, 161, 162 may be of any type such as, for example, central processing units (CPUs), graphics processing units (GPUs) or accelerated processing units (APUs). In one embodiment, the processing units within each group 140, 160 are of the same type, but it is possible for different processors to be included in the same group.

Although each group 140, 160 is illustrated as containing two processing units, this is for illustration purposes. Different size groups of processing units can be used. Also, each group 140, 160 may contain more than two processors or one or both of the groups 140, 160 may have only a single processor.

The processing device 100 may include more than two groups of processing units that share a memory and respective TLB hierarchies. In such case, a translation request of any processing unit that fails to be fulfilled with reference to TLB hierarchy with which that processing unit is associated can result in a probe of all or a subset of the other TLB hierarchies for the requested address translation. In one embodiment, if a hit is encountered in any probed TLB hierarchy, a page table walk is avoided. Alternatively, the probes may be issued in parallel with initiating the page table walk. In such case, if a translation hit is returned by any queried device, the page table walk is aborted or its response is ignored.

Although two TLB hierarchies 130, 150 are illustrated, additional TLB hierarchies may be included in the processing device 100 that are configured to store selected address translations of the page table 120 for additional groups of processing units, respectively. Also, the TLB hierarchies configured to store selected address translations of multiple page tables associated with memory 110 and/or other memories. The TLB hierarchies may also be configured with a single level or multiple levels.

Figure 2:
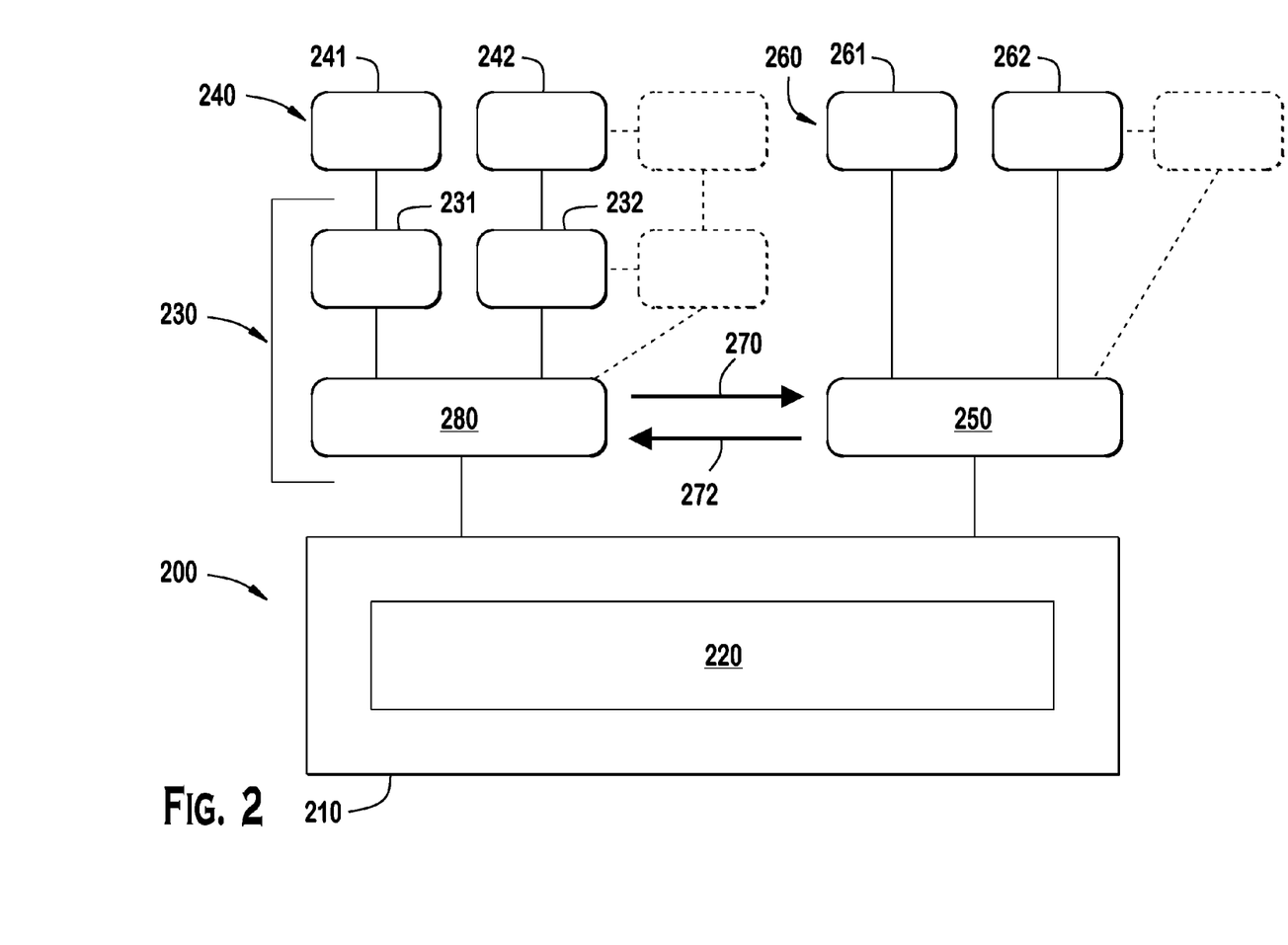
FIG. 2 is a block diagram of a another processing device in which one or more disclosed embodiments may be implemented.

Referring to FIG. 2, a further more specific example, of an embodiment is illustrated. In FIG. 2, an example data processing device 200 has shared memory 210 that includes a page table 220. The processing device 200 includes a first TLB hierarchy 230 that is configured to store selected address translations of the page table 220 for a group 240 of central processing units (CPUs) 241, 242. The TLB hierarchy 230 for the CPU group 240 is a multi-level hierarchy that includes a level one TLB 231, 232 associated respectively with each CPU 241, 242 of the CPU group 240 and a level two TLB 280 associated with the level one TLBs 231, 232.

Variations on the configuration of the TLB hierarchy 230 and/or the CPU group 240 will be readily apparent to those skilled in the art. For example, where further CPUs are included in the CPU group 240, the TLB hierarchy 230 can include a further level one TLB associated respectively with each further CPU and the level two TLB 280 as indicated in phantom. Additionally, the TLB hierarchy 230 may include more than two levels.

In the FIG. 2 example, the processing device 200 also includes a second TLB hierarchy 250 that is configured to store selected address translations of the page table 220 for a group 260 of graphics processing units (GPUs) 261, 262. In this example, the TLB hierarchy 250 for the GPU group 260 is a single level hierarchy that has a single TLB associated respectively with all the GPUs 261, 262 of the GPU group 240.

Variations on the configuration of the TLB hierarchy 250 and/or the GPU group 260 will be readily apparent to those skilled in the art. For example, where further GPUs are included in the GPU group 260, each further GPU is associated with and the TLB 250 as indicated in phantom.

In operation, selected address translations of the page table 220 are stored in the first TLB hierarchy 230 for the group 240 of CPUs 241, 242. Selected address translations of the page table 220 are also stored in the second TLB hierarchy 250 for the group 260 of GPUs 261, 262. In connection with data processing, the CPUs 241, 242, and GPUs 261, 262 will look first for desired address translation in their respective TLB hierarchies 230, 250. With respect to the CPU TLB hierarchy 230, the CPUs 241, 242 will look first in their respective associated level one TLBs 231, 232 and then look in the level two TLB for a desired address translation.

If the desired address translation is found, the need to walk the page table 220 is avoided. If the desired address translation is not found, the page table 220 may need to be walked to find the address translation. Such a page table walk can be very costly in time. For example, in non-virtualized x86 systems, it can require up to four memory accesses to retrieve a desired translation. In virtualized systems with nested page table walking, this can become 24 memory accesses, which is extremely costly.

In the heterogeneous processing device 200 where CPUs and GPUs share the same page table, it is quite possible for translations needed by a CPU may be found in the GPU hierarchy, or vice versa. In the case of computational programs with data sharing between the two CPUs and GPUs, the likelihood that one processing unit's hierarchy holds a translation required by the other increases.

In order to possibly avoid the need to await the results of a walk of the page table 220, the processing device 200 is configured to probe 270 the GPU TLB 250 for an address translation requested by one of the CPUs 241, 242 of the CPU group 240 upon a condition that the requested address translation was not found in the CPU TLB hierarchy 230. The data processing device 200 is further configured to conduct a walk of the page table 220 for the requested address translation upon a condition that the requested address translation was not found in the probe 270 of the GPU TLB 250. As one alternative, the data processing device 200 can be configured to initiate a walk of the page table 220 for the requested address translation concurrently with the probe 270 of the GPU TLB 250.

In one embodiment, the data processing device 200 is also configured to probe 272 the CPU TLB hierarchy 230 for an address translation requested by one of the GPUs 261, 262 upon a condition that the address translation requested by the GPU 261, 262 was not found in the GPU TLB 250. In such case, the data processing device 200 can be configured to conduct a walk of the page table 220 for the address translation requested by the GPU 261, 262 upon a condition that the address translation requested by the GPU 261, 262 was not found in the probe 272 of the CPU TLB hierarchy 230. Alternatively, the data processing device 200 can be configured to initiate a walk of the page table for the address translation requested by the GPU 261, 262 concurrently with the probe 272 of the CPU TLB hierarchy 230.

In a canonical case, a CPU 241, 242 may perform some work on some regions of memory 210 that brings translations of the addresses in that region into its TLB hierarchy 230. The CPU 241, 242 may also offloads some work on that memory region to one or more of the GPUs 261, 262 to perform. The GPU 261, 262 then requires the appropriate address translations in order to access the memory correctly. If a particular address translation for this work by the GPU 261, 262 is not found in the GPU TLB 250, it is highly likely that it will be found in the CPU TLB 230 and, in particular, by probing the CPU TLB hierarchy 230 in a manner in which the CPU that assigned the work to the GPU would search for the address.

For example, CPU 242 may assign work to GPU 261. If GPU 261 requests an address translation for this work but does not find it in the GPU TLB 250, it will probe 272 the CPU TLB 230 for the requested address translation. In such case, the probe 272 will search the level one TLB 232 associated with the CPU 242 and then the level two TLB 280 to find the address translation. If such probing does not yield the address translation, the GPU will await the result of a page table walk for the requested address translation.

In the example processing device 200 that includes groups of CPUs and GPUs, the CPU TLB hierarchy 230 operates in the context of a memory management unit (MMU) and the GPU TLB 250 operates in the context of an input/output memory management unit (IOMMU) that conducts the page table walks. In such context, when a GPU's translation request fails within the GPU TLB, the IOMMU may be configured to send a probe message 272 that includes both the virtual address requested and an Address Space ID (ASID), to the CPU MMU, requesting the desired translation. In the example device 200 having multiple CPUs, the probe may include the id of the CPU that launched the task for which the GPU is making the address translation request thereby directing the probe 272 to that particular CPU saving probe bandwidth. If the probe is successful, the CPU MMU can provide the translation back to the IOMMU much more quickly than the IOMMU performing a full page table walk to satisfy the GPU's address translation request.

An alternative embodiment is for the probe 272 to be made directly to the CPU MMU prior to issuing a request to the IOMMU for a page table walk. If the CPU MMU returns a translation, no IOMMU interaction is initiated by the GPU. In this case, if the CPU MMU also does not contain the translation, an IOMMU request is generated.

Figure 3:
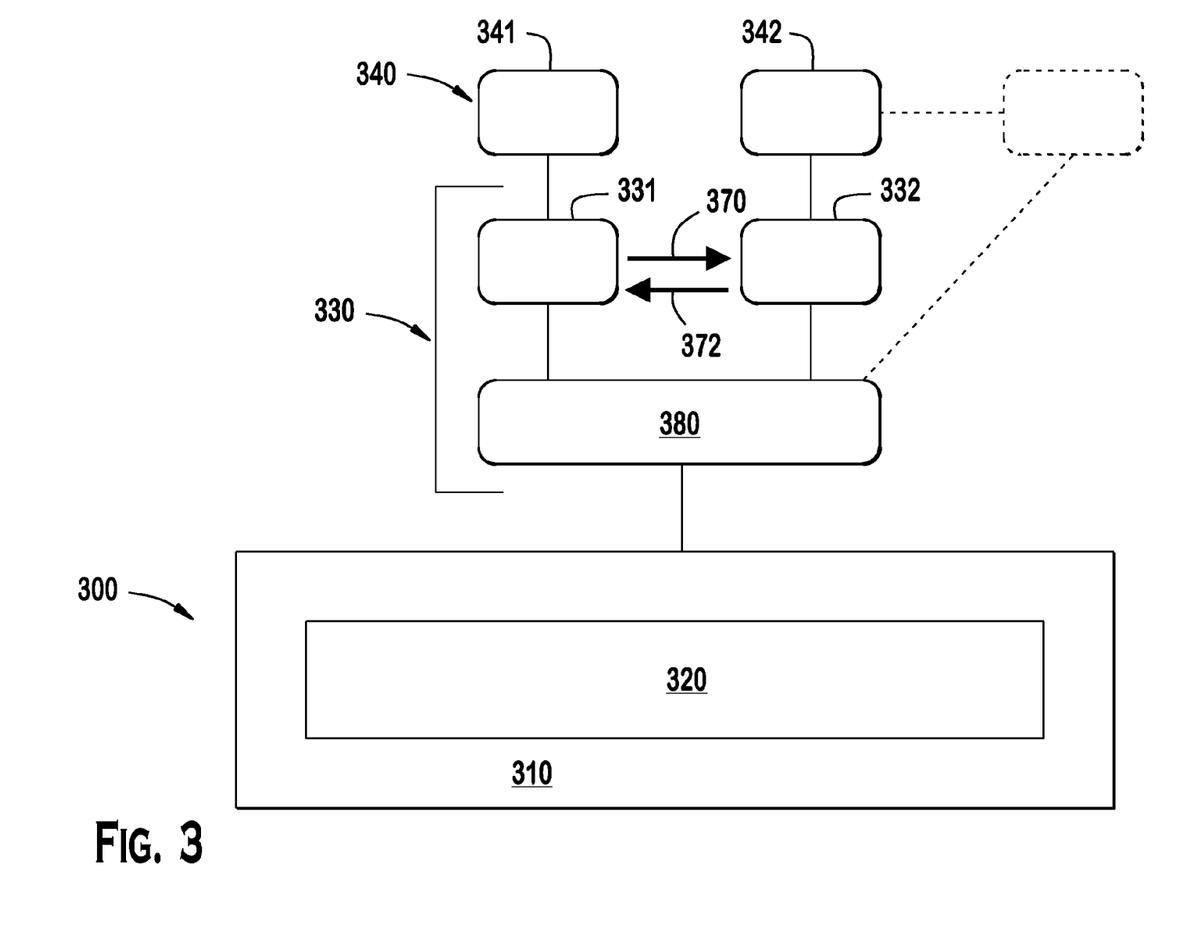
FIG. 3 is a block diagram of a further processing device in which one or more disclosed embodiments may be implemented.

Referring to FIG. 3, a further embodiment is illustrated. In FIG. 3, an example data processing device 300 has shared memory 310 that includes a page table 320. The processing device 300 includes a TLB hierarchy 330 that is configured to store selected address translations of the page table 320 for a group 340 of processing units 341, 342. The TLB hierarchy 330 is a multi-level hierarchy that includes a level one TLB 231, 232 associated respectively with each processing units 341, 342 of the group 340 and a level two TLB 280 associated with the level one TLBs 231, 232.

Variations on the configuration of the TLB hierarchy 330 and/or the group 340 will be readily apparent to those skilled in the art. For example, where further processing units are included in the group 340, the TLB hierarchy 330 can include a further level one TLB associated respectively with each further processing unit and the level two TLB 380 as indicated in phantom. Additionally, the TLB hierarchy 330 may include more than two levels.

In operation, selected address translations of the page table 320 are stored in the TLB hierarchy 330 for the group 340 of processing units 341, 342 where some selected address translations of the page table 320 being stored in the level one TLB 331 for processing unit 341 and some selected address translations of the page table 320 being stored in the level one TLB 332 for processing unit 342. In connection with data processing, the processing units 341, 342 will look first for desired address translation in their respective first level TLB 331, 332 and then look in the level two TLB 380 for a desired address translation.

If the desired address translation is found, the need to walk the page table 320 is avoided. If the desired address translation is not found, the page table 320 may need to be walked to find the address translation.

In order to possibly avoid the need to await the results of a walk of the page table, the processing device 300 is configured to probe 370 the level one TLB 332 for an address translation requested by the processing unit 341 upon a condition that the requested address translation was not found in the level one TLB 331 associated with the processing unit 341. The data processing device 300 is further configured to conduct a walk of the page table 320 for the requested address translation upon a condition that the requested address translation was not found in the probe 370 of the level one TLB 331. As one alternative, the data processing device 300 can be configured to initiate a walk of the page table 320 for the requested address translation concurrently with the probe 370 of the level one TLB 332.

In one embodiment, the data processing device 300 is also configured to probe 372 the level one TLB 331 for an address translation requested by the processing unit 342 upon a condition that the requested address translation was not found in the level one TLB 332 associated with the processing unit 342. The data processing device 300 is further configured to conduct a walk of the page table 320 for the requested address translation upon a condition that the requested address translation was not found in the probe 372 of the level one TLB 332. As one alternative, the data processing device 300 can be configured to initiate a walk of the page table 320 for the requested address translation concurrently with the probe 372 of the level one TLB 331.

The processing units 341, 342 may be of any type such as, for example, central processing units (CPUs), graphics processing units (GPUs) or accelerated processing units (APUs). The FIG. 3 embodiment is also applicable within the groups illustrated with respect to FIG. 1 to provide additional probing before initiating or concurrent with the initiation of a page table walk. The processing device 300 may include more than two processing units that share a memory and respective TLB hierarchy. In such case, a translation request of any processing unit that fails to be fulfilled with reference to level 1 TLB with which that processing unit is associated can result in a probe of all or a subset of the other level one TLBs for the requested address translation. In one embodiment, if a hit is encountered in any probed level one TLB, a page table walk is avoided. Alternatively, the probes may be issued in parallel with initiating the page table walk. In such case, if a translation hit is returned by any queried device, the page table walk is aborted or its response is ignored.

It should be understood that the methods described herein may be implemented in any multi-processor device that employs shared memory and that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements one or more aspects of the disclosed embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A data processing device comprising:
   a first processing unit;
   a second processing unit;
   a page table of a memory shared by the first and second processing units;
   a first translation look-aside buffer (TLB) hierarchy configured to store selected address translations of the page table for use by the first processing unit;
   a second TLB hierarchy configured to store selected address translations of the page table for use by the second processing unit;
   the processing device configured to probe the second TLB hierarchy for an address translation requested by the first processing unit upon a condition that the requested address translation was not found in the first TLB hierarchy; and
   the processing device configured to probe the first TLB hierarchy for an address translation requested by the second processing unit upon a condition that the address translation requested by the second processing unit was not found in the second TLB hierarchy.

2. The data processing device of claim 1 configured to conduct a walk of the page table for the address translation requested by the first processing unit upon a condition that the address translation requested by the first processing unit was not found in the probe of the second TLB hierarchy.

3. The data processing device of claim 1 configured to initiate a walk of the page table for the address translation requested by the first processing unit concurrently with the probe of the second TLB hierarchy.

4. The data processing device of claim 1 configured to conduct a walk of the page table for the address translation requested by the second processing unit upon a condition that the address translation requested by the second processing unit was not found in the probe of the first TLB hierarchy.

5. The data processing device of claim 1 configured to initiate a walk of the page table for the address translation requested by the second processing unit concurrently with the probe of the first TLB hierarchy.

6. The data processing device of claim 1 wherein:
   the first processing unit is a central processing unit (CPU), a graphics processing unit (GPU) or an accelerated processing unit (APU); and
   the second processing unit is a CPU, a GPU or an APU.

7. The data processing device of claim 1 wherein the first processing unit is a CPU and the second processing unit is a GPU.

8. The data processing device of claim 1 further comprising a plurality of first processing units that includes the first processing unit wherein:
   the first TLB hierarchy is configured to store selected address translations of the page table for use by the first processing units.

9. The data processing device of claim 8 wherein each of the first processing units is either a central processing unit (CPU), a graphics processing unit (GPU) or an accelerated processing unit (APU).

10. The data processing device of claim 9 wherein
    all of the first processing units are CPUs; and
    the first TLB hierarchy includes a separate level one TLB associated with each CPU to store selected address translations of the page table for use by that CPU and a level two TLB associated with the level one TLBs; and
    a condition to probe the second TLB hierarchy for an address translation requested by a selected first processing unit is that the address translation requested by the selected first processing unit is not found in a search of the level one TLB associated with the selected first processing unit and the level two TLB.

11. The data processing device of claim 9 wherein
    all of the first processing units are GPUs; and
    the first TLB hierarchy comprises a single TLB associated with all of the GPUs to store selected address translations of the page table for use by the GPUs; and
    a condition to probe the second TLB hierarchy for an address translation requested by a selected first processing unit is that the address translation requested by the selected first processing unit is not found in a search of the single TLB.

12. The data processing device of claim 1 further comprising a plurality of second processing units that includes the second processing unit wherein:
    the second TLB hierarchy includes a separate level one TLB associated with each of the plurality of second processing units to store selected address translations of the page table for use by that second processing unit and a level two TLB associated with the level one TLBs; and
    the processing device is configured to probe the second TLB hierarchy for the address translation requested by the first processing unit by searching the level one TLB associated with a selected second processing unit and the level two TLB to find the address translation requested by the first processing unit.

13. The data processing device of claim 1 further comprising a plurality of first processing units that includes the first processing unit and a plurality of second processing units that includes the second processing unit wherein:
    the first TLB hierarchy is configured to store selected address translations of the page table for use by the first processing units; and
    the second TLB hierarchy configured to store selected address translations of the page table for use by the second processing units.

14. The data processing device of claim 13 wherein:
    each of the first processing units is a central processing unit (CPU), a graphics processing unit (GPU) or an accelerated processing unit (APU); and
    each of the second processing units is a CPU, a GPU or an APU.

15. The data processing device of claim 14 wherein:
    all of the first processing units are CPUs;
    the first TLB hierarchy includes a separate level one TLB associated with each CPU to store selected address translations of the page table for use by that CPU and a level two TLB associated with the level one TLBs;
    a condition to probe the second TLB hierarchy for an address translation requested by a selected first processing unit is that the address translation requested by the selected first processing unit is not found in a search of the level one TLB associated with the selected first processing unit and the level two TLB;
    all of the second processing units are GPUs;
    the second TLB hierarchy comprises a single TLB associated with all of the GPUs to store selected address translations of the page table for use by the GPUs;
    a condition to probe the first TLB hierarchy for an address translation requested by a selected second processing unit is that the address translation requested by the selected second processing unit is not found in a search of the single TLB; and the processing device is configured to probe the first TLB hierarchy for the address translation requested by the selected second processing unit by searching the level one TLB associated with the selected first processing unit and the level two TLB to find the address translation requested by the selected second processing unit.

16. The data processing device of claim 15 configured to:

conduct a walk of the page table for the address translation requested by the selected first processing unit upon a condition that the address translation requested by the selected first processing unit was not found in probe of the second TLB hierarchy; and conduct a walk of the page table for the address translation requested by the selected second processing unit upon a condition that the address translation requested by the selected second processing unit was not found in a probe of the first TLB hierarchy.

17. The data processing device of claim 15 configured to:

initiate a walk of the page table for the address translation requested by the selected first processing unit concurrently with a probe of the second TLB hierarchy; and initiate a walk of the page table for the address translation requested by the selected second processing unit concurrently with a probe of the first TLB hierarchy.

18. A data processing device comprising:

a first processing unit;

a second processing unit;

a page table of a memory shared by the first and second processing units;

a first translation look-aside buffer (TLB) configured to store selected address translations of the page table for use by the first processing unit;

a second TLB configured to store selected address translations of the page table for use by the second processing unit;

the processing device configured to probe the second TLB for an address translation requested by the first processing unit upon a condition that the requested address translation was not found in the first TLB; and the processing device configured to probe the first TLB for an address translation requested by the second processing unit upon a condition that the address translation requested by the second processing unit was not found in the second TLB.

19. The data processing device of claim 18 configured to conduct a walk of the page table for the address translation requested by the first processing unit upon a condition that the address translation requested by the first processing unit was not found in the probe of the second TLB.

20. The data processing device of claim 18 configured to initiate a walk of the page table for the address translation requested by the first processing unit concurrently with the probe of the second TLB.

21. The data processing device of claim 18 further comprising a plurality of first processing units that includes the first processing unit and a plurality of second processing units that includes the second processing unit wherein:

the first TLB is part of a first TLB hierarchy configured to store selected address translations of the page table for use by the first processing units; and the second TLB is part of a second TLB hierarchy configured to store selected address translations of the page table for use by the second processing units.

22. The data processing device of claim 18 further comprising a level two TLB wherein:

the first and second TLBs comprise a first level of a TLB hierarchy configured to store selected address translations of the page table for use by the first and second processing units;

the level two TLB comprises a second level of the TLB hierarchy; and the data processing device is configured to conduct a walk of the page table for the address translation requested by the first processing unit upon a condition that the address translation requested by the first processing unit was not found in either the probe of the second TLB or the level two TLB.

23. The data processing device of claim 18 further comprising a level two TLB wherein:

the first and second TLBs comprise a first level of a TLB hierarchy configured to store selected address translations of the page table for use by the first and second processing units;

the level two TLB comprises a second level of the TLB hierarchy; and the data processing device is configured to initiate a walk of the page table for the address translation requested by the first processing unit concurrently with the probe of the second TLB upon a condition that the address translation requested by the first processing unit was not found in the level two TLB.

24. A method of data processing comprising:

providing a first translation look-aside buffer (TLB) hierarchy configured to store selected address translations of a page table for use by a first processing unit and a second TLB hierarchy configured to store selected address translations of the page table for use by a second processing unit;

probing the second TLB hierarchy for an address translation requested by the first processing unit upon a condition that the requested address translation was not found in the first TLB hierarchy and probing the first TLB hierarchy for an address translation requested by the second processing unit upon a condition that the address translation requested by the second processing unit was not found in the second TLB hierarchy.

25. The data processing method of claim 24 further comprising conducting a walk of the page table for the address translation requested by the first processing unit upon a condition that the requested address translation was not found in the probe of the second TLB hierarchy.

26. The data processing method of claim 24 further comprising initiating a walk of the page table for the address translation requested by the first processing unit concurrently with the probe of the second TLB hierarchy.

27. The data processing method of claim 24 further comprising conducting a walk of the page table for the address translation requested by the second processing unit upon a condition that the address translation requested by the second processing unit was not found in the probe of the first TLB hierarchy.

28. The data processing method of claim 24 further comprising initiating a walk of the page table for the address translation requested by the second processing unit concurrently with the probe of the first TLB hierarchy.

29. The data processing method of claim 24 where the first processing unit is a central processing unit (CPU) of a plurality of CPUs and the first TLB hierarchy includes a separate level one TLB associated with each CPU to store selected address translations of the page table for use by that CPU and a level two TLB associated with the level one TLBs, wherein the probing the second TLB hierarchy for the address translation requested by the first processing unit is upon a condition that the address translation requested by the first processing unit was not found in a search of the level one TLB associated with the first processing unit and the level two TLB.

30. The data processing method of claim 24 where the first processing unit is a graphics processing unit (GPU) of a plurality of GPUs and the first TLB hierarchy comprises a single TLB associated with all of the GPUs to store selected address translations of the page table for use by the GPUs, wherein the probing the second TLB hierarchy for the address translation requested by the first processing unit is upon a condition that the address translation requested by the first processing unit was not found in a search of the single TLB.

31. The data processing method of claim 24 where the second processing unit is one of a plurality of second processing units and the second TLB hierarchy includes a separate level one TLB associated with each of the plurality of second processing units to store selected address translations of the page table for use by that second processing unit and a level two TLB associated with the level one TLBs, further comprising:
probing the second TLB hierarchy for the address translation requested by the first processing unit by searching the level one TLB associated with a selected second processing unit and the level two TLB to find the address translation requested by the first processing unit.

32. The data processing method of claim 24 where the first processing unit is a central processing unit (CPU) of a plurality of CPUs and the first TLB hierarchy includes a separate level one TLB associated with each CPU to store selected address translations of the page table for use by that CPU and a level two TLB associated with the level one TLBs, and where the second processing unit is a graphics processing unit (GPU) of a plurality of GPUs and the second TLB hierarchy comprises a single TLB associated with all of the GPUs to store selected address translations of the page table for use by the GPUs, wherein:
the probing the second TLB hierarchy for the address translation requested by the first processing unit is upon a condition that the address translation requested by the first processing unit was not found in a search of the level one TLB associated with the first processing unit and the level two TLB; and
the probing the first TLB hierarchy for the address translation requested by the second processing unit is upon a condition that the address translation requested by the second processing unit was not found in a search of the single TLB.

33. The data processing method of claim 32 further comprising:
conducting a walk of the page table for the address translation requested by the first processing unit upon a condition that the address translation requested by the first processing unit was not found in the probe of the second TLB hierarchy; and
conducting a walk of the page table for the address translation requested by the second processing unit upon a condition that the address translation requested by the second processing unit was not found in the probe of the first TLB hierarchy.

34. The data processing method of claim 32 further comprising:

initiating a walk of the page table for the address translation requested by the first processing unit concurrently with the probe of the second TLB hierarchy; and
initiating a walk of the page table for the address translation requested by the second processing unit concurrently with the probe of the first TLB hierarchy.

35. A data processing method comprising:
providing a first translation look-aside buffer (TLB) configured to store selected address translations of a page table for use by a first processing unit and a second TLB configured to store selected address translations of the page table for use by a second processing unit;
probing the second TLB for an address translation requested by the first processing unit upon a condition that the requested address translation was not found in the first TLB; and
probing the first TLB for an address translation requested by the second processing unit upon a condition that the address translation requested by the second processing unit was not found in the second TLB hierarchy.

36. The data processing method of claim 35 further comprising conducting a walk of the page table for the address translation requested by the first processing unit upon a condition that the address translation requested by the first processing unit was not found in the probe of the second TLB.

37. The data processing method of claim 35 further comprising initiating a walk of the page table for the address translation requested by the first processing unit concurrently with the probe of the second TLB.

38. The data processing method of claim 35 where the first TLB is part of a first TLB hierarchy configured to store selected address translations of the page table for use by a plurality of first processing units and the second TLB is part of a second TLB hierarchy configured to store selected address translations of the page table for use by a plurality of second processing units, wherein:
probing the second TLB for an address translation requested by a selected first processing unit is upon a condition that the requested address translation by the selected first processing unit was not found in the first TLB hierarchy.

39. The data processing method of claim 35 where the first and second TLBs comprise a first level of a TLB hierarchy configured to store selected address translations of the page table for use by the first and second processing units and a level two TLB comprises a second level of the TLB hierarchy, further comprising:
conducting a walk of the page table for the address translation requested by the first processing unit upon a condition that the requested address translation was not found in either the probe of the second TLB or the level two TLB.

40. The data processing method of claim 35 where the first and second TLBs comprise a first level of a TLB hierarchy configured to store selected address translations of the page table for use by the first and second processing units and a level two TLB comprises a second level of the TLB hierarchy, further comprising:
initiating a walk of the page table for the address translation requested by the first processing unit concurrently with the probe of the second TLB upon a condition that the requested address translation was not found in the level two TLB.

41. A non-transitory computer-readable storage medium storing a set of instructions for execution by a general purpose computer to facilitate manufacture of an integrated circuit that includes:

a first processing unit;

a second processing unit;

a page table of a memory shared by the first and second processing units;

a first translation look-aside buffer (TLB) hierarchy configured to store selected address translations of the page table for use by the first processing unit;

a second TLB hierarchy configured to store selected address translations of the page table for use by the second processing unit;

a processing device configured to probe the second TLB hierarchy for an address translation requested by the first processing unit upon a condition that the address translation requested by the second processing unit was not found in the first TLB hierarchy; and the processing device configured to probe the first TLB hierarchy for an address translation requested by the second processing unit upon a condition that the requested address translation was not found in the second TLB hierarchy.

42. The non-transitory computer-readable storage medium of claim 41, wherein the instructions are hardware description language (HDL) instructions used for manufacture of a device.

43. A non-transitory computer-readable storage medium storing a set of instructions for execution by a general purpose computer to facilitate manufacture of an integrated circuit that includes:

a first processing unit;

a second processing unit;

a page table of a memory shared by the first and second processing units;

a first translation look-aside buffer (TLB) configured to store selected address translations of the page table for use by the first processing unit;

a second TLB configured to store selected address translations of the page table for use by the second processing unit;

a processing device configured to probe the second TLB for an address translation requested by the first processing unit upon a condition that the requested address translation was not found in the first TLB; and the processing device configured to probe the first TLB for an address translation requested by the second processing unit upon a condition that the address translation requested by the second processing unit was not found in the second TLB hierarchy.

44. The non-transitory computer-readable storage medium of claim 43, wherein the instructions are hardware description language (HDL) instructions used for manufacture of a device.

\* \* \* \* \*